(12) United States Patent
Becherer et al.

(10) Patent No.: US 6,811,256 B1
(45) Date of Patent: Nov. 2, 2004

(54) POST-OPHTHALMOLOGIC PROCEDURE LENSES AND METHODS

(76) Inventors: Paul Douglas Becherer, 69 Country Club Pl., Belleville, IL (US) 62223; Robert L. Davis, 2506 Braeburn, Flossmoor, IL (US) 60422

(*) Notice: Subject to any disclaimer, the term of this patent is extended or adjusted under 35 U.S.C. 154(b) by 189 days.

(21) Appl. No.: 10/010,242

(22) Filed: Dec. 6, 2001

Related U.S. Application Data

(60) Provisional application No. 60/254,236, filed on Dec. 8, 2000, and provisional application No. 60/254,250, filed on Dec. 8, 2000.

(51) Int. Cl.[7] .............................................. G02C 7/04
(52) U.S. Cl. ...................................................... 351/162
(58) Field of Search .......................... 351/160 R, 160 H, 351/161, 162, 177

(56) References Cited

U.S. PATENT DOCUMENTS

| | | | | |
|---|---|---|---|---|
| 4,576,453 A | * | 3/1986 | Borowsky | 351/162 |
| 5,191,365 A | * | 3/1993 | Stoyan | 351/160 R |
| 5,428,412 A | * | 6/1995 | Stoyan | 351/177 |
| 5,662,706 A | * | 9/1997 | Legerton et al. | 623/5.13 |
| 5,905,561 A | * | 5/1999 | Lee et al. | 623/6.31 |

* cited by examiner

*Primary Examiner*—Scott J. Sugarman
(74) *Attorney, Agent, or Firm*—Polster, Lieder, Woodruff & Lucchesi, L.C.

(57) ABSTRACT

Contact lens designed to ameliorate undesired effects of ophthalmological procedures or trauma. In one embodiment, the lens includes a clear center for positioning over the center of a dilated pupil with a surrounding darkened zone to restrict the entry of light into pupil. In another embodiment, the lens includes a corrective anterior curvature and a zoned posterior curvature having a substantially flat central area and an adjacent zone of the same or shorter radius of curvature designed to align with a post-refractive cornea curvature to correct refractive light and to focus the light on the retina in unsuccessful refractive surgery and not collapse or wrinkle on the cornea.

11 Claims, 2 Drawing Sheets

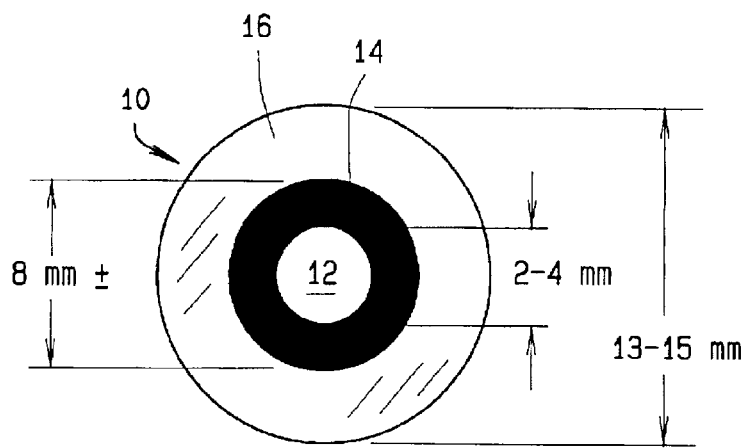
FIG. 1
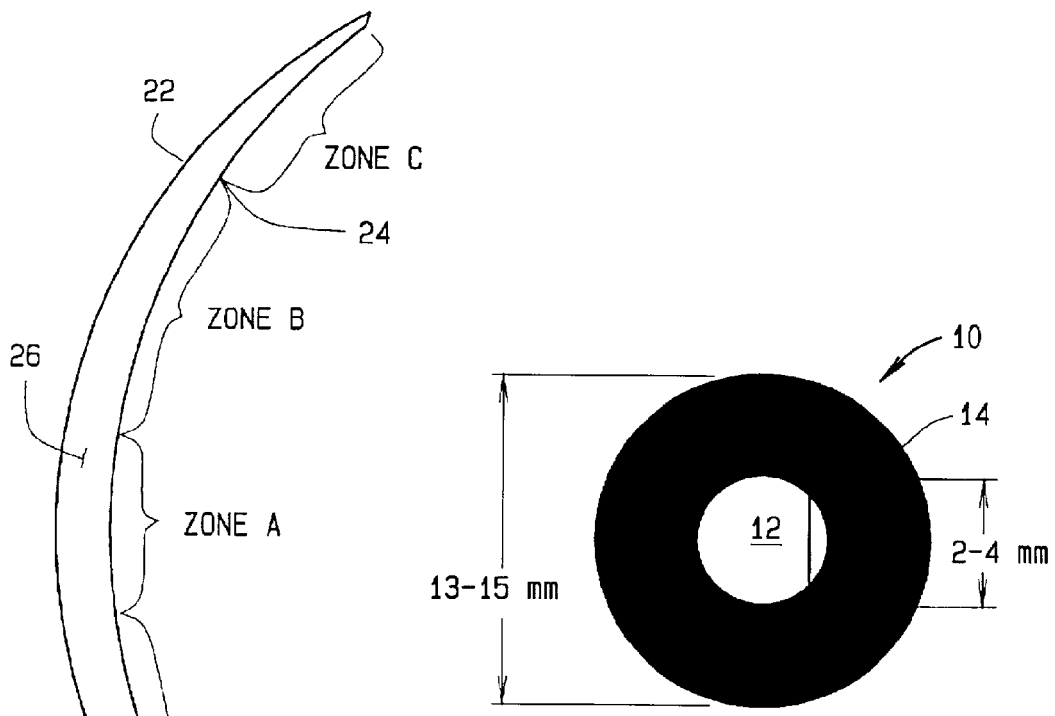
FIG. 2
FIG. 3

POST-OPHTHALMOLOGIC PROCEDURE LENSES AND METHODS

CROSS-REFERENCE TO RELATED APPLICATIONS

This application claims priority to provisional application Ser. No. 60/254,236 and provisional application Ser. No. 60/254,250 filed Dec. 8, 2000.

BACKGROUND OF THE INVENTION

The invention relates to generally ophthalmological devices and, more particularly, to contact lenses worn by a patient immediately after an ophthalmologic procedure, such as refractive surgery or dilation of the pupil, to facilitate vision and recovery from the procedure.

There are approximately 150,000,000 eye examinations conducted in the United States per year. During a substantial number of these eye examinations, the doctor dilates the pupil of the patient's eyes with a pharmaceutical to facilitate examination of the interior of the eye. For example, the doctor will dilate the pupil with an anticholinergic cycloplegic mydriatic to block the responses of the sphincter muscle of the iris and the muscle of the ciliary body to cholinergic stimulation producing pupillary dilation (mydriasis) and paralysis of accommodation (cycloplegia). The peak action of many of the pharmaceuticals can exceed the time required for the examination and, consequently, the pupil remains dilated for some time after the examination is completed. Because the pupil is dilated and the eye cannot accommodate changes in ambient light, it can be difficult for some patients to function under these conditions and patients will refuse dilation and examination because of the inconvenience resulting from the difficulty in seeing clearly with dilated pupils.

Further, many eye examinations result in a patient electing to have refractive surgery to correct impaired vision. The pioneering procedures included radial keratotomy, wherein the cornea was manually cut in a spoked type pattern to flatten the cornea in an effort to correct vision. This procedure had certain drawbacks, such as blurring and difficulty seeing at night. Laser keratectomy later replaced most radial keratotomy as the procedure of choice. In laser keratectomy, a surgical laser was used to flatten the cornea by shaving layers of the cornea away. The current procedure of choice is laser-assisted in-situ keratomilcusis, or LASIK. During LASIK the surgeon uses a microtome or other device to create a corneal flap. The shape of the underlying cornea is modified with an eximer laser or some other laser device or other means, and the flap is replaced.

Regardless of the type of refractive surgery employed, there can be failures. That is, the surgery is unsuccessful in correcting the patient's vision. In fact, the cornea can remain permanently distorted and the vision impaired. Often the distortion cannot be corrected or the patient refuses to submit to another surgery. If conventional contact lenses are employed in this condition, the posterior curvature has a tendency to conform to the flattened corneal surface and become wrinkled or distorted.

In any event, it would be advantageous to employ a simple, cost-effective device to ameliorate the undesirable effects of an ophthalmological procedure, being either a simple pupillary dilation or an unsuccessful refractive surgery.

SUMMARY OF THE INVENTION

The present invention contemplates the use of novel contact lenses which are introduced to the patient's eye after an ophthalmological procedure, to ameliorate any undesired effect of the procedure. In one embodiment, the invention comprises a lens that reduces the untoward effects of dilation of the pupil. In another embodiment of the invention the lens is designed to normalize the refraction of a cornea distorted through unsuccessful refractive surgery.

One aspect of the invention includes a post-dilation contact lens that reduces the amount of light that enters the eye. The lens comprises a soft contact lens generally having no optical power. The lens has a clear zone of approximately 2 mm to 4 mm in diameter that is positioned over the dilated pupil to allow entry of a limited amount of light for sight. A light-blocking zone comprised of a dark ring surrounds the clear zone. The dark zone can be impenetrable to light or very dark so as to substantially reduce the amount of light that can enter the pupil. The dark zone can be limited in width or can extend to the perimeter edge of the lens.

In another aspect of the invention, the post-procedure lens is a soft contact lens that normalizes the refraction of a distorted cornea. The lens has substantially normally curved front or anterior surfaces that normalizes the light entering the eye. The inside surface, or cornea-contacting surface, is divided into zones. There is a first or central flattened zone of approximately 4 mm to 9 mm, which is positioned over the pupil. The flattened zone is at least one (1) diopter flatter than the adjoining or second zone. That second zone, which surrounds the first zone, generally has a standard radius of curvature that is the same as the flattened zone or steeper. A third zone or radius adjoining the second zone has a curvature which is flatter or longer radius of curvature than the second zone. The lens aligns properly with the shape of the post-refractive surgery cornea to correct refractive light to focus on the retina. The flattened zone conforms to the shape of the cornea at the pupil and conforms to a surgically flattened cornea without collapsing or wrinkling, for example.

Therefore, it is among the various objects of the present invention to provide contact lenses that can be placed on the eye of a subject who has undergone an ophthalmological procedure to amcliorate any undesirable effects of the procedure.

It also is among the various objects of the present invention to provide contact lenses that can be placed on the eye of a subject who has suffered trauma to the eye or has a defect of the eye to ameliorate any undesirable effects of the procedure or the defect.

In one aspect of the invention, the lens is designed to restrict entry of light through a dilated pupil.

In another aspect of the invention, the lens aligns with the shape of a cornea following unsuccessful surgery to correct refractive light to focus on the retina.

These and other aspects and objects of the invention will be apparent to those skilled in the art upon review of the detailed description of the invention.

BRIEF DESCRIPTION OF THE DRAWINGS

FIG. 1 is a front elevational view of one embodiment of the post-dilation lens of the present invention;

FIG. 2 is a front elevational view of an alternative embodiment of the post-dilation lens of the present invention;

FIG. 3 is a side elevation view of a post-corneal surgery lens of the present invention.

DETAILED DESCRIPTION OF THE INVENTION

Figure 4:
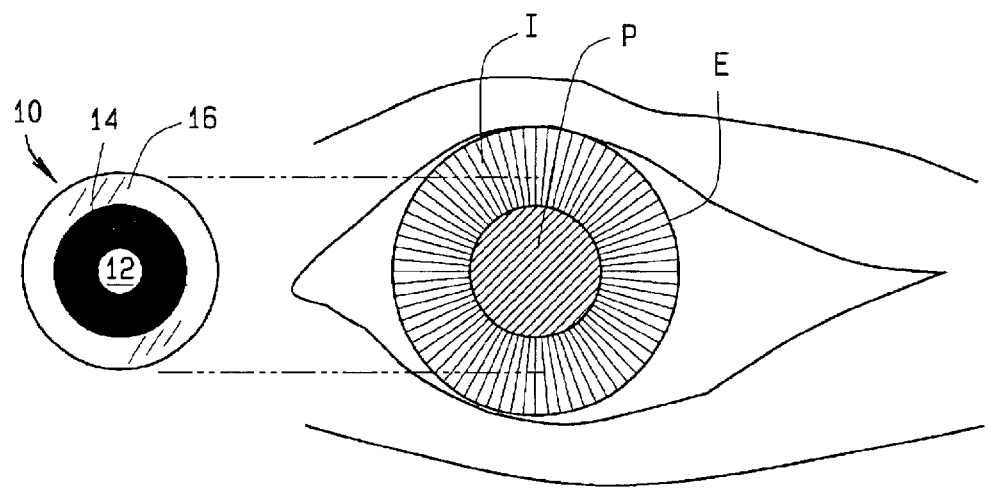
FIG. 4 illustrates a post-dilation lens of the present invention prior to application to an eye having a dilated pupil.

One embodiment of the lens of the present invention is illustrated in FIGS. 1 and 2. A post-dilation lens of the present invention is indicated by reference numeral 10 in FIGS. 1 and 2. Lens 10 is a soft contact lens having an overall diameter of approximately 13 mm to 15 mm. The lens 10 may have an optical power or no optical power. Lens 10 includes a clear zone 12 in the center. Zone 12 is approximately 2 mm to 4 mm in diameter and is designed to be positioned over the pupil of a subject. A third zone 14 surrounds zone 12. Zone 14 is dark, as will be explained below. In the embodiment of lens 10 shown in FIG. 1, zone 14 is approximately 8 mm in diameter (which subsumes zone 12). Zone 14 can be any desired diameter.

As shown in FIG. 1, a third zone 16 surrounds zone 14, which also is clear. In the embodiment of lens 10 shown in FIG. 2, zone 14 extends to the perimeter edge of lens 10 and there is no third zone. In either embodiment, zone 14 is a dark color, for example black, which obstructs the passage of light and can totally block the light or reduce the amount of light that can pass through the zone depending upon the darkness or opacity of zone 14. Consequently, zone 14 effectively functions to constrict the area open to passage of light to the pupil and thus restricts the amount of light that can pass through the pupil. As referred to herein dark can mean black, gray or any shade of color, tinting or the like that can obstruct the passage of light and block or reduce the amount of light passing through the zone. The darkened zone also can be resistant to penetration by ultraviolet radiation.

Figure 5:
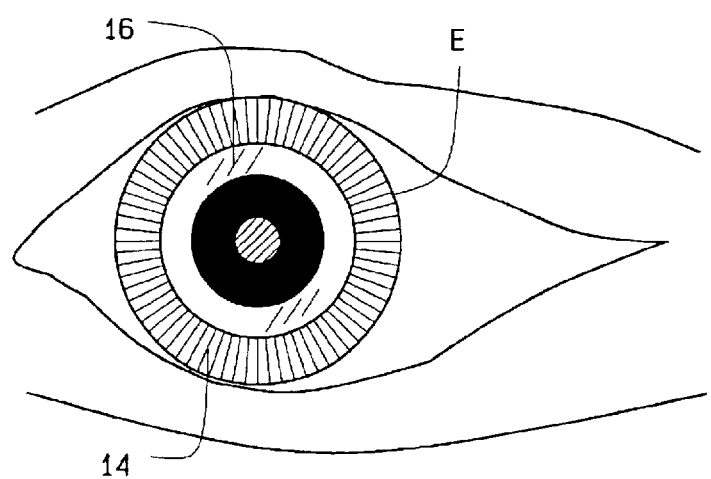
FIG. 5 illustrates a post-dilation lens of the present invention applied to the eye having a dilated pupil; and Corresponding reference numerals indicate corresponding elements throughout the various drawings.

In either embodiment of the invention, the darker area can be used to reduce or block light entering the pupil. FIGS. 4 and 5 illustrate the application of lens 10 to the eyeball E of a subject. As seen in FIG. 4, the typical eyeball E includes an iris I surrounding a pupil P. In FIG. 4, pupil P is dilated, or substantially greater in diameter relative to the iris I than typically observed except in extremely dark environment. As shown in FIG. 5, lens 10 is placed on the surface of the eyeball E. The clear zone 12 is placed over the pupil and zone 14 significantly reduces the diameter of the pupil, thereby reducing the amount of light which can enter the pupil. That is, zone 14 impinges on a substantial circumferential margin of pupil P to effectively reduce the light-admitting diameter of the pupil while zone 12 allows enough light to pass so as to support vision.

One major application of lens 10 is post-dilation. The doctor fits the lens to the patient's eye after dilation and examination. The patient then is given instructions on removal and disposal and can remove the lens after the pupil resumes its normal function.

Lens 10 can be provided in plano power or corrective power, as needed. The lens also can be prescribed for patients other than those experiencing post-examination dilation. For example, a patient whose eye(s) permanently have lost the ability to constrict properly. Although the preferred embodiment of the lens 10 is in a disposable form made from an appropriate acrylic, hemaphylic, silicone or any other material used in making contact lenses, the lens can be constructed in a reusable, sterilizable form without departing from the scope of the invention.

FIG. 3 illustrates another embodiment of a post-opthalmological procedure contact lens, indicated generally by reference numeral 20. Lens 20 is designed to correct vision in an eye that has a cornea that can be described as relatively flat. The term "relatively flat" or "relatively flattened" as used herein means that the curvature of the cornea is somewhat flatter than that of the cornea of a typical eye in the average individual. The relatively flattened cornea may result from a surgical intervention intended to correct vision by flattening the cornea or from trauma or simply an anatomical anomaly. In any event, lens 20 generally is indicated to correct the refractive power of a patient's eye after an unsuccessful refractive surgery. When LASIK or other surgical procedures are employed to correct vision, the goal generally is to improve refractive power by flattening the cornea. If the cornea is not appropriately flattened, the patient's vision is not corrected. Lens 20 allows light to refract to the patient's cornea by normalizing the refraction of a distorted cornea while appropriately conforming to the surgically flattened cornea.

In one preferred embodiment, lens 20 is a disposable soft contact lens. Of course, lens 20 can be reusable or even of the "hard" construction without departing from the scope of the invention. In any event, lens 20 has an anterior surface 22 and a posterior surface 24 with a material thickness 26 in-between. Lens 20 can be formed from any acceptable material, such as acrylic, or any other material used in making contact lenses. Anterior surface 22 has a curvature that is appropriate to normalize light entering the eye. The determination of the appropriate curvature of the anterior surface 22, i.e. the anterior curvature, is made by conventional procedures known to the art.

The curvature of the posterior surface 24 is determined by conventional methods and is based upon the shape of the post-surgical cornea. In the present invention, posterior surface 24 is divided into zones, Zone A, Zone B and Zone C. Zone A is a flattened area having a diameter of approximately 4 mm to 9 mm and is at least one (1) diopter flatter than the secondary or standard curvature of Zone B, which is adjacent to Zone A. Zone A is designed to position over the center of the patient's pupil. Zone C can be fashioned to have a bi-curve, or a fitting curve that us usually a larger radius of curvature than the original curvature of the central region of the cornea prior to the cornea being altered by surgery or injury. The larger radius of curvature is referred to as a fitting curvature and is designed to allow a flow of tears under the lens.

Zone C can be fashioned to have multiple radii of curvatures, typically with each curvature being flatter in the more peripheral curves. The posterior surface 24 of lens 20 also can be an aspheric design that will usually have an increasing radii of curvature, that is, it gradually becomes flatter from the central zone or Zone A to the periphery of the lens, rather than be divided into multiple discrete zone.

It will be appreciated that conventional non-rigid contact lenses radii of curvature can be described as steep, having, for example, a radius of curvature of approximately 8.2 mm to approximately 8.3 mm; medium, having a radius of curvature of approximately 8.4 mm to 8.8 mm; and flat, having a radius of curvature of approximately 8.9 mm to around 9.1 mm or greater, the larger the number indicating a flatter curvature. Also in conventional contact lenses, the zone adjacent the center zone usually is flatter than the central zone. However, in the present invention, the center zone or Zone A is substantially flatter than the center zone of a conventional lens so that the posterior surface can conform to the surgically flattened cornea. Correspondingly, the adjacent zone, Zone B, in lens 20 of the present invention has a radius of curvature the same as or steeper than Zone A to accommodate a more dramatic transition from the flattened area over the pupil to the adjacent area of the post-surgical cornea. By comparison, the area of a conventional contact lens that corresponds to Zone B usually is flatter than the area corresponding to Zone A. Generally speaking, the area that corresponds to Zone C is the same in the novel lens as in a conventional lens. However, it can be altered to conform to the shape of the eye.

Table 1, below, is an illustrative comparison of an exemplary conventional lens and one exemplary embodiment of lens 20 of the present invention:

TABLE 1

| | Conventional Contact Lens | Lens 20 of the Present Invention |
|---|---|---|
| Zone A Radius of Curvature | 8.6 mm | 9.2–10.5 mm |
| Zone B Radius of Curvature | 9.8 mm | 9.2 to 10.5 mm or less than 9.2 mm, e.g. 9.0 mm |
| Zone C Radius of Curvature | 11 mm to 14 mm | 11 mm to 14 mm |

It will be appreciated by those skilled in the art that the foregoing chart is illustrative only of a comparison between an exemplary conventional contact lens and one exemplary embodiment of a lens 20 of the present invention. Lenses of the present invention, as well as conventional lenses, may have different radii of curvature. However, it will be appreciated from a review of Table 1 that Zone A of the novel lens is substantially flatter than that corresponding area of a conventional lens. Further, it will be noted, that Zone B of the novel lens 20 is not flatter than Zone A of the novel lens, as is the case with the conventional lens, wherein the area corresponding to Zone B in the conventional lens generally is substantially flatter than the area corresponding to Zone A in the conventional lens (e.g. 9.8 mm compared to 8.6 mm). In the lens of the present invention Zone B can have the same radius of curvature as Zone A or a radius of curvature that is steeper than Zone A. By way of example only, an embodiment of the novel lens could have a relatively flat Zone A with a radius of curvature of 10.5 mm and a relatively steep Zone B, having a radius of curvature of 9.0 mm. Zone C of each lens, which is considered the fitting curvature, generally would be the same in both lenses. These relative relationships of radii of curvature between the respective areas facilitates appropriate fitting of the lens to the post-surgical cornea.

It also will be appreciated that an alternative embodiment of the present invention provides an aspheric design wherein the radius of curvature of the posterior surface of the lens would gradually increase from approximately 9.2 mm, for example, to approximately 14 mm, for example. There would be no discrete zones.

In any event, this novel design provides for a main or primary curvature of the lens that positions over the pupil having an appropriate refractive power determined by conventional methods. However, in novel lens 20 which is designed to be used after a procedure such as LASIK, the band or zone immediately surrounding the central zone (i.e. Zone B) would be the same as or steeper than the central zone (i.e. Zone A) since the central zone area of the cornea has been surgically flattened. The band or zone adjacent the central zone would, however, may be a flatter radius of curvature than what the cornea would have measured in a radius of curvature prior to surgery.

As explained above, the curvature of anterior surface 22 is of the appropriate refractive power to normalize the light entering the eye. The zoned posterior surface 24 is based upon the curvature of the post-surgical cornea and will align properly to the shape of the post-surgical cornea to correct the refractive light to focus on the retina. The posterior radius of curvature is based upon the resultant corneal shape and will approximate the amount of dioptric change in the prescription resulting from the change from the pre-surgical refractive power of the eye to the post-surgical refractive power of the eye. Because Zone A is substantially flatter than the central posterior curvature of a conventional contact lens, the novel lens will conform to the corneal surface and will not distort or wrinkle. The anterior curvature of lens 20, in cooperation with the resultant rear curvature will compensate for ametropia, which is defined as the imperfect refractive power of the eye (i.e. hyperopia, myopia, or astigmatism), in which the principal focus does not lie on the retina.

It will be appreciated that various changes and modifications may be made in the lenses of the present invention without departing from the scope of the appended claims. Also, it should be noted that the lenses of the present invention have been described as used to ameliorate undesirable effects of ophthalmological interventions, it will be appreciated that the lenses also may be used to ameliorate undesirable effects on the eye which occur as a result of trauma, congenital abnormalities or another other condition or event that may result in dilation of the pupil or flattening of the cornea. Therefore, the foregoing description and accompanying drawings are intended to be illustrative only and should not be construed in a limiting sense.

What is claimed is:

1. An artificial lens for ameliorating undesired effects of an ophthalmological procedure performed on the eye of a subject, comprising:

a generally circular lens body having an anterior surface and a posterior surface for engaging the subject's eye, said lens having a substantially clear, annular center area greater than approximately 4 mm in diameter for positioning over a pupil of the eye and an adjacent light restricting area surrounding the substantially clear center area, said light restricting area having an annular inner margin and an annular outer margin and uniform opacity across the expanse between the recited margins and being disposed to impinge upon and restrict the light that enters a dilated pupil of the eye through the substantially clear center area.

2. The artificial lens of claim 1 further comprising a peripheral, substantially clear area surrounding the light restricting area.

3. The artificial lens of claim 1 wherein the light restricting area is a substantially dark color of uniform opacity.

4. The artificial lens of claim 3 wherein the light restricting area is black in color.

5. The artificial lens of claim 1 wherein the light restricting area is approximately 8 mm in diameter.

6. The artificial lens of claim 1 wherein the light restricting area is approximately 13 mm to approximately 15 mm in diameter.

7. An artificial lens for limiting the amount of light that enters an eye through a dilated pupil of an eye of a subject, comprising:

a generally circular lens body having an anterior surface and a posterior surface for engaging the surface the subject's eye, said lens having a substantially clear, annular center zone having a diameter greater than 4 mm for positioning over the pupil of the eye and an adjacent annular light restricting zone of uniform opacity surrounding the substantially clear center zone, said light restricting zone disposed to impinge upon a peripheral edge the dilated pupil and limit light that enters the pupil of the eye through the substantially clear area.

8. The artificial lens of claim 7 formed from an artificial lens material selected from the group of materials comprising acrylic, hemaphylic and silicone.

9. A method of restricting the amount of light that enters the dilated pupil of the eye of a subject in need of such light restriction comprising:

placing an artificial lens over the pupil of the subject's eye, said artificial lens having a generally circular lens body with an anterior surface and a posterior surface for engaging the surface the subject's eye, said lens having a substantially clear center zone greater than 4 mm in diameter having no vision corrective properties, and an adjacent light restricting zone of uniform opacity across a width of the light restricting zone surrounding the substantially clear center zone, resulting in a center zone having a circumference less than the circumference of the dilated pupil; and positioning said clear center zone over the pupil of the eye whereby said clear center zone allows light to enter the dilated pupil while said light restricting zone impinges upon and limits the light that enters the pupil of the eye through the clear center zone.

10. The method of claim 9 wherein the subject is in need of such light restriction as a result of an ophthalmologic procedure comprising pharmacological dilation of the pupil.

11. The method of claim 9 wherein the subject is in need of such light restriction as a result of a trauma to the subject's eye resulting in dilation of the pupil.

* * * * *

UNITED STATES PATENT AND TRADEMARK OFFICE
CERTIFICATE OF CORRECTION

PATENT NO. : 6,811,256 B1
DATED : November 2, 2004
INVENTOR(S) : Becherer et al.

It is certified that error appears in the above-identified patent and that said Letters Patent is hereby corrected as shown below:

Column 1,
Line 45, replace "keratomilcusis" with -- keratomileusis --

Column 2,
Line 40, replace "amcliorate" with -- ameliorate --

Signed and Sealed this

Nineteenth Day of April, 2005

JON W. DUDAS
*Director of the United States Patent and Trademark Office*